US012646729B2

(12) United States Patent
Yapici et al.

(10) Patent No.: US 12,646,729 B2
(45) Date of Patent: Jun. 2, 2026

(54) SYSTEMS AND METHODS FOR HYDROGEN LEAK DETECTION

(71) Applicant: Cummins Inc., Columbus, IN (US)

(72) Inventors: Tarkan Yapici, Richmond (GB); Max Donald Carruthers, Yarm (GB); Jithin Benjamin, Columbus, IN (US); Archit N. Koti, Sunnyvale, CA (US); Stephen James McLaren, Middleton-One-Row (GB); Arun Harohalli Chandra Shekar, Columbus, IN (US); Mehfoos Lal Yacoob, York (GB)

(73) Assignee: Cummins Inc., Columbus, IN (US)

( * ) Notice: Subject to any disclaimer, the term of this patent is extended or adjusted under 35 U.S.C. 154(b) by 288 days.

(21) Appl. No.: 18/456,968

(22) Filed: Aug. 28, 2023

(65) Prior Publication Data

US 2024/0079616 A1      Mar. 7, 2024

Related U.S. Application Data

(60) Provisional application No. 63/403,487, filed on Sep. 2, 2022.

(51) Int. Cl.
H01M 8/04664      (2016.01)
B60L 3/00      (2019.01)
(Continued)

(52) U.S. Cl.
CPC ....... H01M 8/04679 (2013.01); B60L 3/0053 (2013.01); B60L 58/30 (2019.02); G01M 3/002 (2013.01); G01M 3/025 (2013.01); G01M 3/32 (2013.01); H01M 8/04365

(2013.01); H01M 8/0438 (2013.01); B60L 3/0023 (2013.01); B60L 3/0046 (2013.01); B60L 50/70 (2019.02);
(Continued)

(58) Field of Classification Search
CPC ........ G01M 3/002; G01M 3/025; G01M 3/32; H01M 8/04679; H01M 8/04365; H01M 8/0438; H01M 8/043; H01M 2250/20; B60L 3/0053; B60L 58/30; B60L 3/0023; B60L 3/0046; B60L 50/70; B60L 58/00
See application file for complete search history.

(56) References Cited

U.S. PATENT DOCUMENTS 7,343,251 B1      3/2008   Farnsworth et al.
9,108,529 B2      8/2015   Takada et al.
(Continued)

FOREIGN PATENT DOCUMENTS

CN      203882406      10/2014
CN      113447212      9/2021
(Continued)

*Primary Examiner* — Benjamin R Schmitt
(74) *Attorney, Agent, or Firm* — Barnes & Thornburg LLP

(57) ABSTRACT

The present disclosure relates to systems and methods of detecting a hydrogen leak in a system comprising a hydrogen storage system storing hydrogen, a temperature sensor, a pressure sensor, a hydrogen storage system controller, and a notification system. The hydrogen storage system controller is configured to measure thermodynamic properties of the hydrogen in the hydrogen storage system, and the thermodynamic properties of the hydrogen are used to determine if there is a hydrogen leak in the fuel cell system. The notification system alerts a user of any detected hydrogen leak.

19 Claims, 7 Drawing Sheets

(51) Int. Cl.

| | | |
|---|---|---|
| *B60L 58/30* | (2019.01) | |
| *G01M 3/00* | (2006.01) | |
| *G01M 3/02* | (2006.01) | |
| *G01M 3/32* | (2006.01) | |
| *H01M 8/0432* | (2016.01) | |
| *H01M 8/0438* | (2016.01) | |
| *B60L 50/70* | (2019.01) | |
| *B60L 58/00* | (2019.01) | |
| *H01M 8/043* | (2016.01) | |

(52) U.S. Cl.
CPC .............. *B60L 58/00* (2019.02); *H01M 8/043* (2016.02); *H01M 2250/20* (2013.01)

(56) References Cited

U.S. PATENT DOCUMENTS

| | | | |
|---|---|---|---|
| 10,209,158 | B2 | 2/2019 | Cho et al. |
| 11,251,447 | B2 | 2/2022 | Kou et al. |
| 2021/0047971 | A1 | 2/2021 | Turner et al. |

FOREIGN PATENT DOCUMENTS

| | | | | |
|---|---|---|---|---|
| CN | 113809360 | | 12/2021 | |
| DE | 102012210137 | | 12/2013 | |
| JP | 2005011703 | A * | 1/2005 | ............ H01M 8/043 |
| JP | 2020080261 | | 5/2020 | |
| KR | 100837933 | | 6/2008 | |
| KR | 20170108510 | | 9/2017 | |
| WO | WO-2006056878 | A2 * | 6/2006 | ........ H01M 8/04753 |

* cited by examiner

SYSTEMS AND METHODS FOR HYDROGEN LEAK DETECTION

CROSS-REFERENCE TO RELATED APPLICATIONS

This nonprovisional application claims the benefit and priority, under 35 U.S.C. § 119(e) and any other applicable laws or statutes, to U.S. Provisional Application Ser. No. 63/403,487 filed on Sep. 2, 2022, the entire disclosure of which is hereby expressly incorporated herein by reference.

TECHNICAL FIELD

The present disclosure relates to systems and methods of detecting a hydrogen leak in a hydrogen storage system that provides fuel to a fuel cell system, a fuel cell engine, or a hydrogen internal combustion engine.

BACKGROUND

Vehicles and/or powertrains use fuel cells or fuel cell stacks in fuel cell engines or fuel cell systems for their power needs. A fuel cell or fuel cell stack in the fuel cell engine or fuel cell system may generate electricity in the form of direct current (DC) from electrochemical reactions that take place in the fuel cell or fuel cell stack. A fuel processor converts fuel into a form usable by the fuel cell or fuel cell stack. The fuel cell engine may be powered by hydrogen or a hydrogen-rich, conventional fuel, such as methanol, gasoline, diesel, or gasified coal.

Fuel, for example, hydrogen, is stored in a hydrogen storage system comprising one or more hydrogen tanks. Such hydrogen storage systems can also be used with internal combustion engines that use hydrogen as a gaseous fuel.

In the case of fuel cell engines or fuel cell systems, the fuel stream is exhausted from a fuel cell or fuel cell stack outlet and recirculated back to the anode through an anode inlet. It is important to timely detect any hydrogen leak in the fuel cell system. Hydrogen concentration sensors are widely used in fuel cell systems that use hydrogen as fuel. However, when the fuel cell system is powered, these reactive sensors start detecting and transmitting hydrogen concentration accurately after some time because the sensors may not be capable of doing it any quicker. However, it may be important to be able to detect hydrogen leaks before the response time when the hydrogen concentration sensors may not be able to provide accurate hydrogen concentration information.

The present disclosure provides systems and methods for detecting a hydrogen leak from a hydrogen storage system. The hydrogen storage system may supply hydrogen to a fuel cell engine, fuel cell system in a fuel cell electric vehicle or a vehicle with a hydrogen internal combustion engine. The present disclosure provides systems and methods for detecting a hydrogen leak immediately after the fuel cell electric vehicle is powered. The present disclosure is directed toward systems and methods for measuring the thermodynamic properties of hydrogen stored in the hydrogen storage system of the fuel cell system.

SUMMARY

Embodiments of the present disclosure are included to meet these and other needs.

In one aspect, described herein, a system for hydrogen leak detection comprises a hydrogen storage system comprising hydrogen equipped with a temperature sensor and a pressure sensor configured to estimate a mass of the hydrogen in the hydrogen storage system based on measurements of one or more thermodynamic properties of the hydrogen, a hydrogen storage system controller, and a notification system. The measurements of the one or more thermodynamic properties are utilized to by the hydrogen storage system controller to detect a hydrogen leak in the system. The notification system is configured to alert a user of the hydrogen leak.

In some embodiments, the hydrogen storage system controller may be configured to detect a hydrogen leak in the system when a powertrain or vehicle comprising the system undergoes system wake-up after a shutdown period. The hydrogen leak may be detected by determining a first mass of hydrogen in the hydrogen storage system before the powertrain or vehicle is shut down and a second mass of hydrogen in the hydrogen storage system after the powertrain or vehicle undergoes system wake-up.

In some embodiments, the difference between the first mass of hydrogen in the hydrogen storage system and the second mass of hydrogen in the hydrogen storage system may be compared to a pre-set leak reference amount to detect an occurrence of the hydrogen leak. In some embodiments, the pre-set leak reference amount may be pre-determined based on one or more user inputs, models, and/or look-up tables. In some embodiments, the difference between the first mass of hydrogen in the hydrogen storage system and the second mass of hydrogen in the hydrogen storage system may be a hydrogen delta mass determined by first-order filtering.

In some embodiments, the one or more thermodynamic properties of the hydrogen may include pressure, temperature, or volume of hydrogen in the hydrogen storage system, and the hydrogen storage system controller may calculate a mass of the hydrogen in the hydrogen storage system based on the one or more thermodynamic properties.

In some embodiments, the hydrogen storage system controller may be configured to incorporate a calibrated amount of delay time before detecting the hydrogen leak in the system.

In some embodiments, the calibrated amount of delay time and pre-set leak reference may account for hydrogen permeability.

In some embodiments, the system may further comprise a reset button, configured to override the notification system. In some embodiments, the hydrogen storage system controller may communicate the hydrogen leak to other nodes or components of the system.

According to a second aspect, described herein, a method of detecting a hydrogen leak in a powertrain or vehicle comprises measuring one or more thermodynamic properties of hydrogen in a hydrogen storage system before the powertrain or vehicle is shutdown, detecting a first mass of hydrogen in the hydrogen storage system before the powertrain or vehicle is shutdown based on the one or more thermodynamic properties of hydrogen in a hydrogen storage system before the powertrain or vehicle is shutdown, measuring the one or more thermodynamic properties of hydrogen in the hydrogen storage system after the powertrain or vehicle is restarted, detecting a second mass of hydrogen in a hydrogen storage system after the powertrain or vehicle is restarted based on the one or more thermodynamic properties of hydrogen in the hydrogen storage system after the powertrain or vehicle is restarted, calculating a hydrogen mass leak rate of a hydrogen leak in the powertrain or vehicle, and preventing damage to the vehicle or powertrain when there is a hydrogen leak.

In some embodiments, the method may further comprise calculating the hydrogen mass leak rate in the powertrain or vehicle using a hydrogen storage system controller. In some embodiments, the method may further comprise calculating the hydrogen mass leak rate using the first mass of hydrogen and the second mass of hydrogen and a stay-put time and comparing the hydrogen mass leak to a pre-set leak reference to determine an occurrence of the hydrogen leak In some embodiments, the method may further comprise comparing the first mass of hydrogen in the hydrogen storage system and the second mass of hydrogen in the hydrogen storage system and calculating a hydrogen delta mass using first-order filtering. In some embodiments, the method may further comprise utilizing the pre-set leak reference amount based on a user input, a model, and/or a look-up table.

In some embodiments, the method may further comprise the hydrogen storage system controller waiting for a calibrated amount of delay time before detecting the hydrogen leak in the powertrain or vehicle. In some embodiments, a hydrogen permeability comprises the calibrated amount of delay time and a pre-set leak reference.

In some embodiments, the method may further comprise the hydrogen storage system controller communicating an occurrence of the hydrogen leak to other nodes or components of the powertrain or vehicle. In some embodiments, the method may further comprise using a notification system to alert a user of the hydrogen leak. The notification system may comprise an audio signal, a visual signal, or a warning to the user. In some embodiments, the method may further comprise pressing a reset button to override the notification system.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The present disclosure provides systems and methods used for detecting a hydrogen leak from a hydrogen storage system 210, such as immediately after a vehicle or powertrain 100 comprising the hydrogen storage system 210 is powered. The present disclosure is directed to devices, systems, and methods of measuring thermodynamic properties of hydrogen stored in the hydrogen storage system 210 and determining and/or preventing hydrogen leakage based on those measurements. The present disclosure is directed towards determining and/or measuring a difference in hydrogen mass in the hydrogen storage system 210 at two or more distinct time points and using the difference of the measurements to identify hydrogen leaks from the hydrogen storage system 210.

Figure 1A:
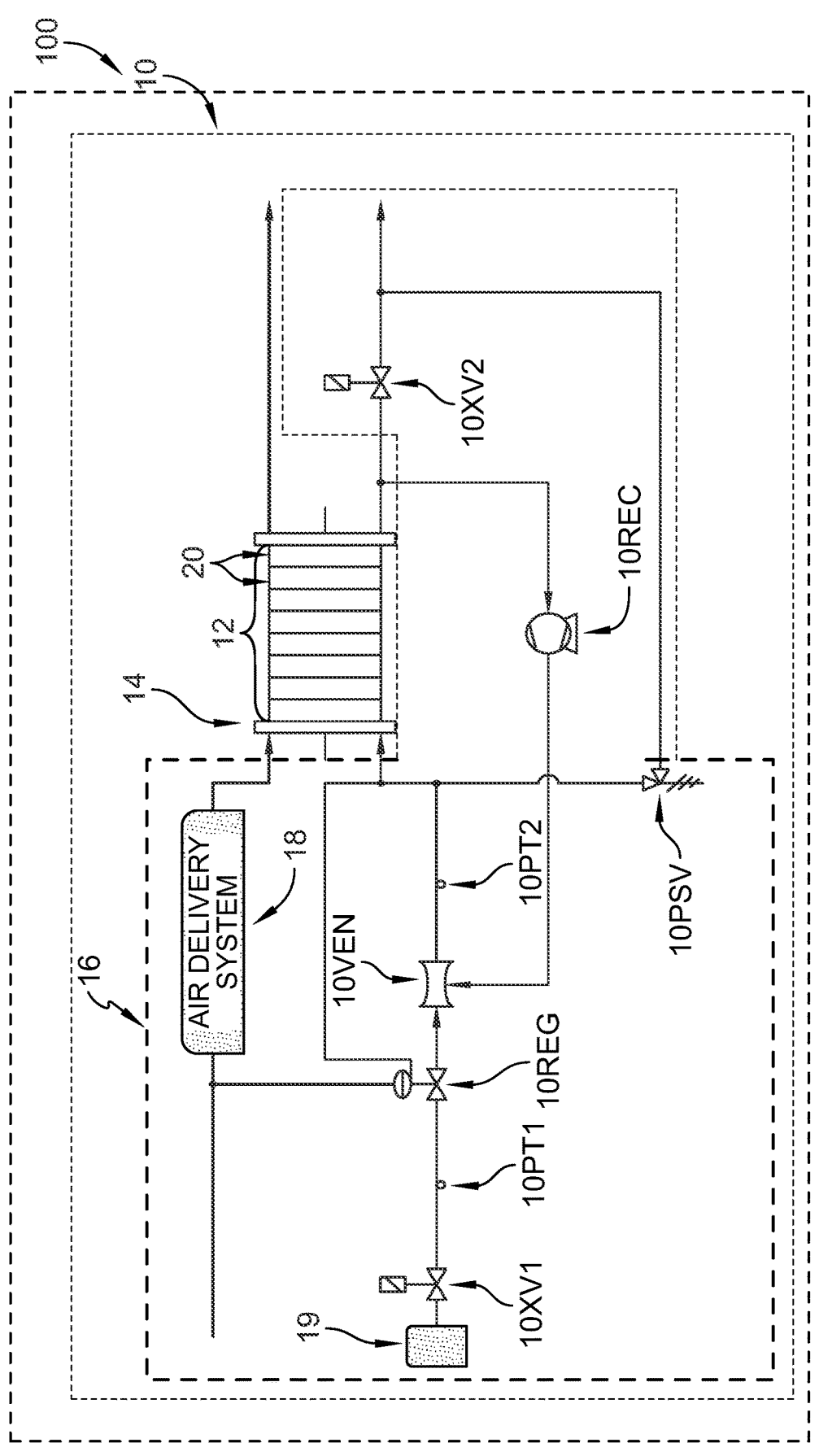
FIG. 1A is a schematic view of an exemplary fuel cell system including an air delivery system, a hydrogen delivery system, and a fuel cell module including a stack of multiple fuel cells.
Figures 1B, 1C:
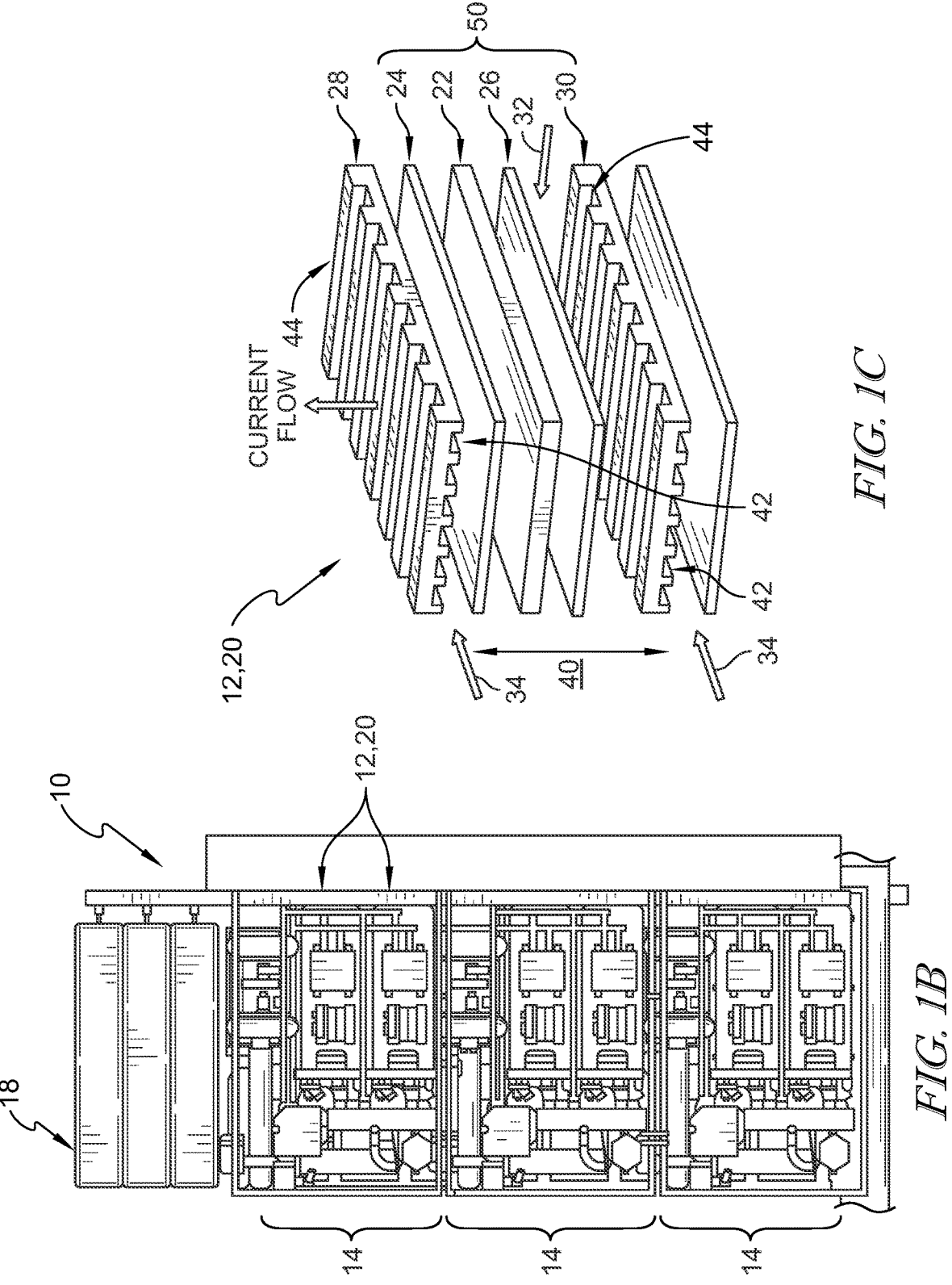
FIG. 1B is a cutaway view of an exemplary fuel cell system including an air delivery system, hydrogen delivery systems, and a plurality of fuel cell modules each including multiple fuel cell stacks.
FIG. 1C is a perspective view of an exemplary repeating unit of a fuel cell stack of the fuel cell system of FIG. 1A.

The hydrogen storage system 210 may be configured to be connected to or attached to a power source 10 in order to store and/or supply a fuel 32 to the power source 10. The power source 10 may be a fuel cell engine or a fuel cell system 10, as shown in FIG. 1A-C. In some embodiments, the hydrogen storage system may supply fuel to a power source 10 that is an internal combustion engine 10, a supercapacitor 10, or a battery 10. In further embodiments, the hydrogen storage system may supply fuel to more than one of fuel cell system or fuel cell engine 10, an internal combustion engine, and a battery.

As shown in FIG. 1A, fuel cell systems 10 often include one or more fuel cell stacks 12 ("STK") or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
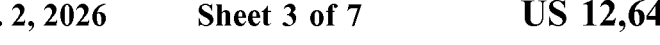
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

In some embodiments, such as that shown in FIG. 1A, the fuel cell system 10 may include an on/off valve 10XV1, a pressure transducer 10PT1, a mechanical regulator 10REG, and a venturi 10VEN arranged in operable communication with each other and downstream of the hydrogen delivery system and/or source of hydrogen 19. The pressure transducer 10PT1 may be arranged between the on/off valve 10XV1 and the mechanical regulator 10REG. In some embodiments, a proportional control valve may be utilized instead of a mechanical regulator 10REG. In some embodiments, a second pressure transducer 10PT2 is arranged downstream of the venturi 10VEN, which is downstream of the mechanical regulator 10REG.

In some embodiments, the fuel cell system 10 may further include a recirculation pump 10REC downstream of the stack 12 and operably connected to the venturi 10VEN. The fuel cell system 10 may also include a further on/off valve 10XV2 downstream of the stack 12, and a pressure transfer valve 10PSV.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2:
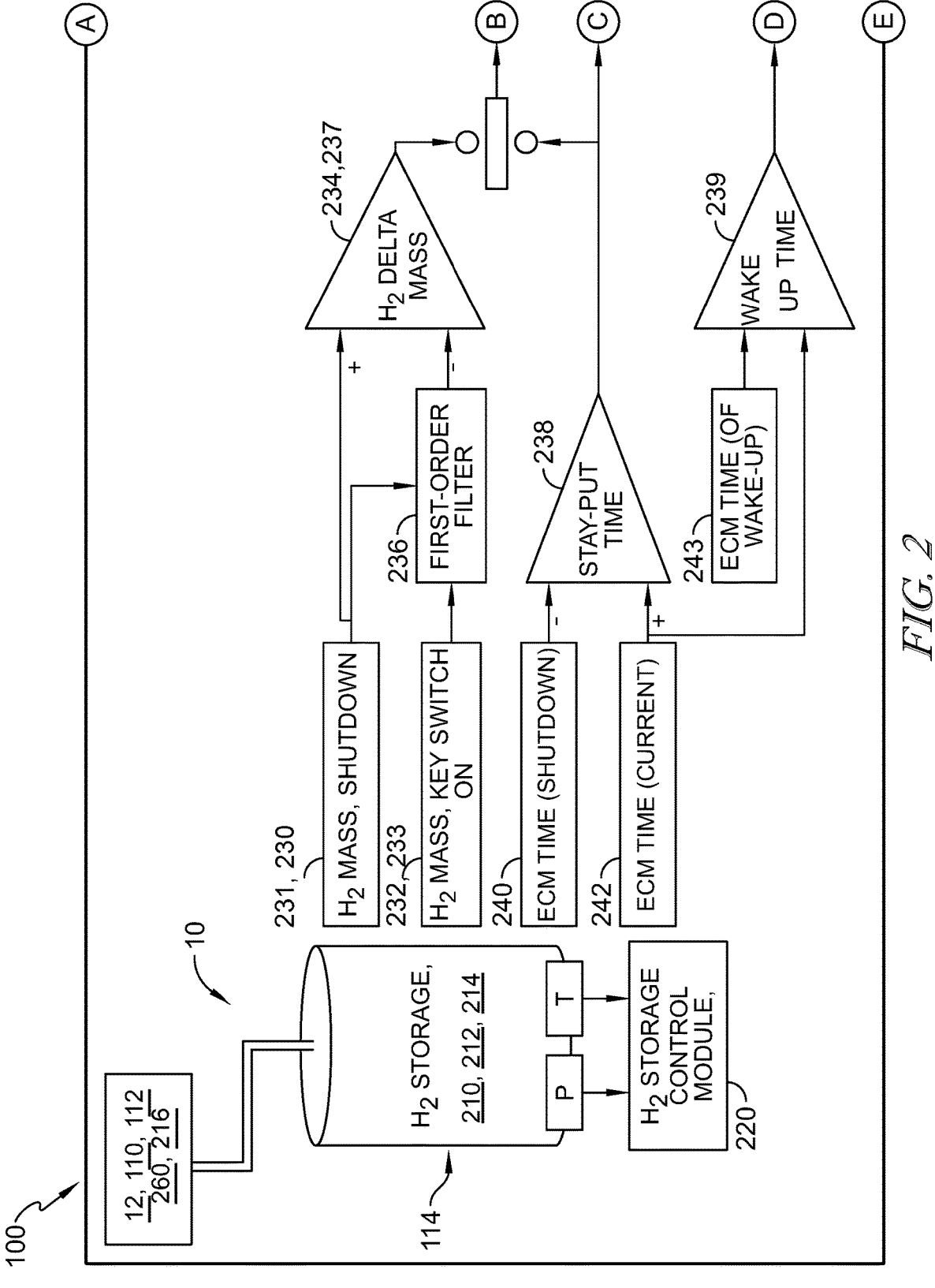
FIG. 2 is a schematic showing the implementation of a hydrogen leak notification system in a fuel cell system.
Figure 2:
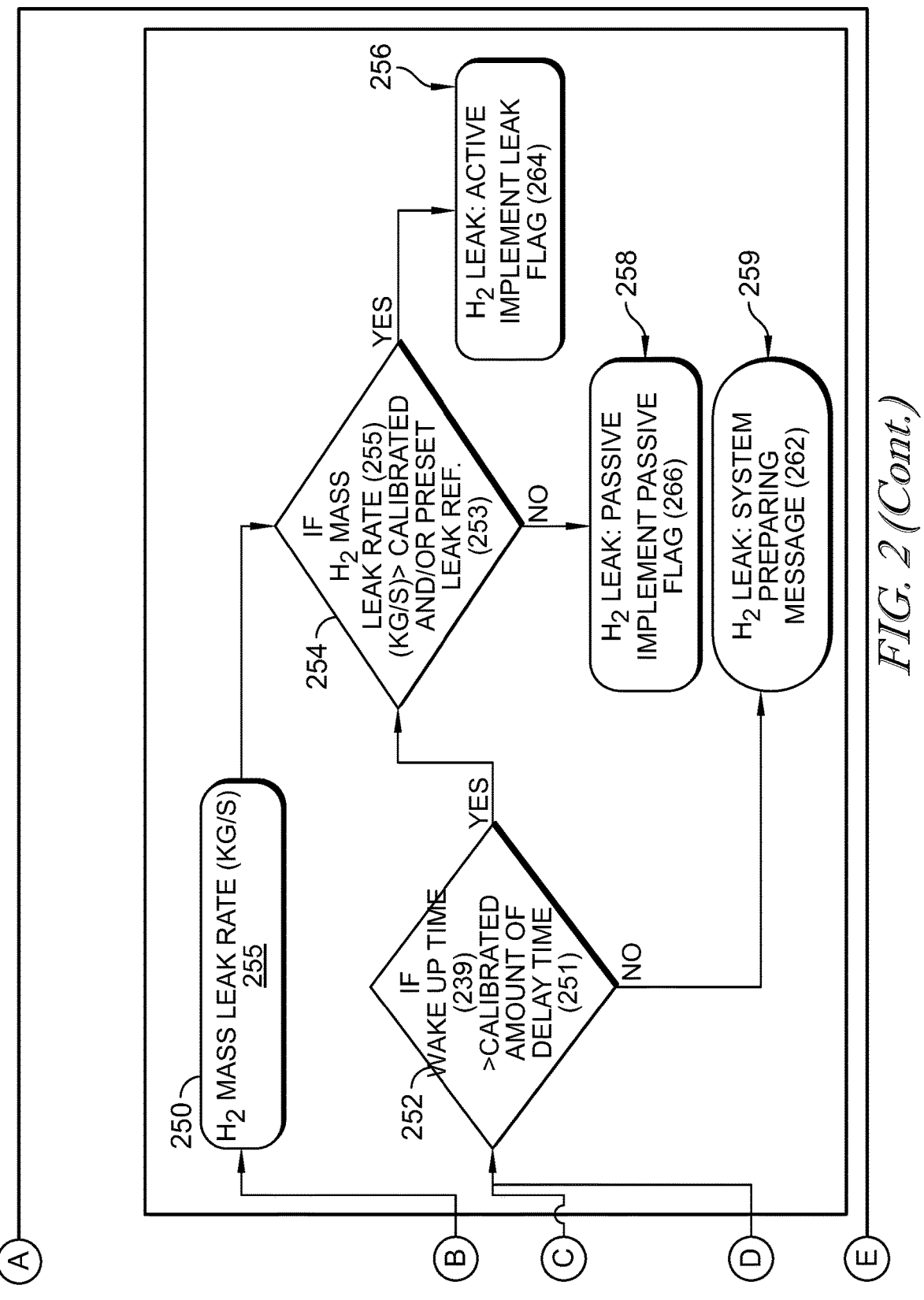

As shown in FIG. 2, a method of detecting a hydrogen leak in a hydrogen storage system 210 may include using one or more hydrogen concentration sensors 110. The hydrogen concentration sensors 110 may be utilized in the present system 210 after a required response time and/or following restarting the vehicle or powertrain 100. In some embodiments, the method may be implemented in systems 210 not comprising hydrogen concentration sensors 110. In some embodiments, the method may be implemented in systems 210 comprising a pressure sensor 216, a temperature sensor 216, and/or a hydrogen concentration sensor 110.

In some embodiments, as shown in FIG. 2, the pressure or temperature sensors 216 may be implemented when the hydrogen concentration sensors 110 are not operative (e.g., before a sensor response time). The sensor response time of the hydrogen concentration sensors 110 may depend on the specifications of the hydrogen concentration sensors 110 and/or may depend on the time required to implement, activate, and/or use the hydrogen concentration sensors 110. Sensors 110 and 216 may be positioned to take pressure, temperature, and/or hydrogen concentration measurements in any location in the vehicle or powertrain 100, such as in the driver cabin, under the driver cabin, in the fuel cell stack 12, in the hydrogen storage system 210, and/or at other locations in the vehicle or powertrain 100.

The method of detecting the hydrogen leak in the hydrogen storage system 210 may include using, activating, and/or implementing the pressure and/or temperature sensors 216 when the hydrogen concentration sensors 110 cannot be utilized, activated, and/or implemented. The method of detecting the hydrogen leak in the hydrogen storage system 210 may include using the pressure and/or temperature sensors 216 to determine a mass of hydrogen in the hydrogen storage system 210 at two or more distinct time points.

The method of detecting the hydrogen leak in the hydrogen storage system 210 may include using the pressure and/or temperature sensors 216 to determine a first mass of hydrogen 231 in the hydrogen storage system 210 (e.g., at shutdown, referred to as a shutdown hydrogen mass 230). The method of detecting the hydrogen leak in the hydrogen storage system 210 may include using the pressure and/or temperature sensors 216 to determine a second mass of hydrogen 233 in the hydrogen storage system 210 (e.g., after the vehicle or powertrain 100 undergoes a system wake-up or key switch-on, referred to as a wake-up hydrogen mass 232). The second mass of hydrogen 233 (e.g., the wake-up hydrogen mass 232) is measured instantaneously after the vehicle 100 undergoes a system wake-up. The vehicle 100 undergoes the system wake-up for a certain amount of time after being powered because the vehicle 100 requires that time to wake-up or undergo key switch-on before starting. A difference between the first mass of hydrogen and the second mass of hydrogen may be utilized by a notification system 260 to identify either an active hydrogen leak 264 or a passive hydrogen leak 266, as described in detail below.

The method of detecting the hydrogen leak may comprise calculating a hydrogen mass leak rate is based on a calculated mass of hydrogen in the hydrogen storage system 210 of the vehicle or powertrain 100. As shown in FIG. 2, such a mass-based leak detection method as the present method can be used to detect leaks that may occur when the vehicle 100 is parked. This mass-based leak detection method can also be utilized to detect leaks when an electronic control system 112 comprised in the vehicle 100 is turned off. The electronic control system 112 may include the hydrogen concentration sensors 110, pressure and/or temperature sensors 216, and/or systems to control the hydrogen concentration sensors 110, as well as the pressure and/or temperature sensors 216 in the vehicle 100.

In some instances, the hydrogen concentration sensors 110 cannot be utilized, activated, and/or implemented when the electronic control system 112 is shut down. In such instances, the hydrogen concentration sensors 110 may be unable to detect one or more hydrogen leaks. Therefore, the present method of detecting the hydrogen leak may be based on the calculated mass of hydrogen in the hydrogen storage system 210.

A hydrogen storage system controller 220 can be configured, designed, and/or implemented to measure, analyze, interpret, and/or determine pressure and/or temperature in the hydrogen storage system 210. The hydrogen storage system controller 220 may make or process measurements at various locations using the pressure and/or temperature sensors 216 to determine the mass of hydrogen in the hydrogen storage system 210 at different times. The thermodynamic properties of hydrogen including pressure, temperature, and/or volume of hydrogen in the hydrogen storage system 210 can be used to determine the amount of hydrogen consumed and whether that consumption exceeds an expected amount of hydrogen usage so as to indicate a hydrogen leak.

The hydrogen storage system controller 220 of the hydrogen storage system 210 can compute the mass of the gas or fuel (e.g., hydrogen or H 2) by using temperature, pressure, and/or volume inputs in the hydrogen storage system 210. Ambient temperature and/or pressure conditions may also be utilized to increase the accuracy and/or precision of hydrogen storage computations and measurements. Consumption or leakage of hydrogen in the hydrogen storage system 210 may be determined by implementing one or more of the present methods that include assessing an initial and a final temperature, pressure, and/or volume measurements in the hydrogen storage system 210, such as by measuring those parameters.

Referring again to FIG. 2, the hydrogen storage system 210 may be a fixed volume storage system 114 and may include one or more hydrogen storage tanks 212 and/or gas delivery piping 214. The hydrogen storage tanks 212 and/or gas delivery piping 214 may be located in the vehicle 100, in a stationary powertrain, and/or some other detached or attached storage mechanism. In some embodiments, the hydrogen storage system 210 may include additional components, parts, and/or compounds that may affect the thermodynamic properties, such as the temperature, pressure, and/or volume of the hydrogen stored in it.

The hydrogen storage system controller 220 can be designed, configured, and/or implemented to compute a hydrogen mass leak rate. The hydrogen storage system controller 220 can calculate, determine, and/or estimate the shutdown hydrogen mass 230, such as mass of hydrogen before the fuel cell system 10 shuts down. As shown in FIG. 2, the shutdown hydrogen mass 230 is the mass of hydrogen in the hydrogen storage system 210 as measured, calculated, and/or determined before the fuel cell system 10 is shutdown. The hydrogen storage system controller 220 can also determine and/or estimate the wake-up hydrogen mass 232. The wake-up hydrogen mass 232 is the mass of hydrogen in the hydrogen storage system 210 after the fuel cell system 10 is powered and undergoes system wake-up.

The system wake-up hydrogen mass 232 is subtracted from the shutdown hydrogen mass 230 after a shutdown period 237 to determine a hydrogen delta mass 234. The shutdown period 237 is the period of time for which the fuel cell system 10 is shut down before wake-up. In some embodiments, the hydrogen delta mass 234 may be determined after obtaining consistent measurements and/or after the measurements obtained are smoothed out or streamlined via mechanisms, such as first-order filtering 236.

As shown in step 250 of FIG. 2, the hydrogen mass leak rate 255 may be calculated as a difference in the shutdown hydrogen mass 230 and the system wake-up hydrogen mass 232 divided by a stay-put time period 238. The stay-put time period 238 may be a time period between a shutdown time 240 and a current time 242. The stay-put time period 238 may also be the same time period as the shutdown period 237, which is used to determine the hydrogen delta mass 234. Thus, the shutdown period 237 may depend on the shutdown time 240 and on the current time 242.

Similarly, the vehicle or powertrain 100 may also comprise a wake-up time 239. The wake-up time 239 depends on the difference in the current time 242 and a time of wake-up 243. The time of wake-up 243 is the time that the vehicle 100 undergoes wake-up and/or the wake-up hydrogen mass 232 is measured.

As shown in step 252 of FIG. 2, the hydrogen storage system controller 220 may be configured, designed, and/or implemented to wait for a calibrated amount of delay time 251 before determining and/or detecting a hydrogen mass leak rate in step 254. The hydrogen storage system controller 220 may incorporate the calibrated amount of delay time 251 before detecting the hydrogen leak in the vehicle 100. The calibrated amount of delay time 251 is determined to ensure accuracy in the detection of a hydrogen leak in the hydrogen storage system 210.

Waiting for the calibrated amount of delay time 251 ensures that hydrogen mass leak rate measurements are being made over a time period that is long enough to prevent measurement errors. For example, the system 210 or controller 220 may avoid a false positive when the vehicle 100 is shut down for a relatively long period. Similarly, the system 210 or controller 220 may avoid a false negative when the vehicle 100 is shut down for a relatively short period.

The calibrated amount of delay time 251 may be pre-determined based on one or more user inputs, models, and/or look-up tables. The calibrated amount of delay time 251 may range from about 0.1 to about 20 seconds, including any specific time or range of time comprised therein. In some embodiments, the calibrated amount of delay time 251 may range from about 2 seconds, from about 2 seconds to about 5 second, from about 5 seconds to about 10 seconds, or from about 10 seconds to about 20 seconds. In some embodiments, the calibrated amount of delay time 251 may be more than about 20 seconds or less than about 0.1 seconds.

For example, the calibrated amount of delay time 251 may be from about 0.1 to about 5 seconds, from about 0.1 to about 1 second, from about 0.1 second to about 0.5 second, and from about 0.5 second to about 1 second. For example, if the vehicle 100 is shut down for more than one day, the vehicle 100 may be deemed to have been shut down for a relatively long period. Alternately, if the vehicle 100 is shut down for a day or less, for example for an overnight stop, the vehicle 100 may be deemed to have been shut for a relatively short period.

If the wake up time 239 is greater than the calibrated amount of delay time 251, step 254 is executed to determine a potential leak. Leak determination and/or detection by the controller 220 may be based on a leak rate determination, as illustrated in step 254. Leak rate determination may be made based on the rate (kilogram/second) of change of hydrogen in the hydrogen storage system 210. There may be an expected leak rate for any given hydrogen storage system 210 and if the rate of change of hydrogen varies from a calibrated reference 253 and/or a pre-set leak reference 253, a leak may be detected and/or identified.

An expected rate of change of hydrogen in the hydrogen storage system 210 may be indicative of hydrogen leak. For example, if the expected rate of change of hydrogen in the hydrogen storage system 210 is about 1 kg/s under ideal conditions and the calibrated and/or pre-set leak reference 253 of hydrogen is about 1.1 kg/s, a leak may be detected and/or identified if the hydrogen leak rate is greater than about 1.1 kg/s. In some embodiments, first-order filtering may smooth out the hydrogen delta mass 234 calculation until the wake-up time 239 is greater than the calibrated time delay 251. Still referring to FIG. 2, at any given stay-put time 238, loss of hydrogen mass from the hydrogen storage system 210 will not result in a false alarm unless the wake-up time 239 is greater than the calibrated time delay 251 and the hydrogen mass leak rate 255 is above the calibrated and/or pre-set leak reference 253.

The present method may account for the hydrogen mass lost from the storage system 210 because of hydrogen permeability. Hydrogen can react with the metal inside a hydrogen tank 212 or pass all the way through to the outside surface of the hydrogen storage system 210, effectively resulting in a very small hydrogen leak to the atmosphere. Therefore, any hydrogen storage system 210 will naturally lose some amount of the stored hydrogen and the amount of the hydrogen leak will be proportional to the time and mechanical properties of the material of the hydrogen storage system 210. If hydrogen permeability is not considered, false alarms may frequently occur.

As shown in step 254 of FIG. 2, the hydrogen storage system controller 220 may compare the hydrogen mass leak rate 255 to the calibrated and/or pre-set leak reference 253. More specifically, the calibrated and/or pre-set leak reference 253 may be a minimal amount of acceptable, baseline hydrogen loss. The minimal amount of acceptable, baseline hydrogen may depend on the characteristics of the fuel cell system 10 comprised in the vehicle 100 and/or on the function of the vehicle 100. The calibrated and/or pre-set leak reference 253 may be pre-determined based on one or more user input, models, artificial intelligence, machine learning, and/or look-up tables.

When the hydrogen mass leak rate 255, as seen in step 254 in FIG. 2, is more than the calibrated and/or pre-set leak reference 253, the hydrogen storage system controller 220 may diagnose a hydrogen leak from the hydrogen storage system 210. The hydrogen storage system controller 220 may also notify and/or implement the notification system 260 to issue an active hydrogen leak flag 264, as shown in step 256. The hydrogen storage system controller 220 may issue the active hydrogen leak flag 264 to signal an active leak in the fuel cell system 10.

The active hydrogen leak flag 264 may be an audio signal 264, a visual signal 264, and/or a warning 264, such as to a user or an operator. The active hydrogen leak flag 264 may also be an electronic and/or digital signal 264, message 264, and/or notice 264 (e.g., in the vehicle 100 and/or to a phone or personal device of a user or operator).

If the hydrogen mass leak rate 255 is not more than the calibrated and/or pre-set leak reference 253, the hydrogen storage system controller 220 may not diagnose a hydrogen leak from the hydrogen storage system 210. Therefore, the hydrogen storage system controller 220 may implement the notification system 260 to indicate a passive hydrogen leak flag 266 in step 258. The hydrogen storage system controller 220 may also issue the passive hydrogen leak flag 266 to signal a passive loss of hydrogen of a stay-put loss of hydrogen. The passive loss of hydrogen of the stay-put loss of hydrogen indicates loss of hydrogen that may occur due to natural causes, such as evaporation when the vehicle 100 is not operating.

The passive hydrogen leak flag 266 may be an audio signal 266, a visual signal 266, and/or a warning 266, such as to a user or an operator. The passive hydrogen leak flag 266 may also be an electronic and/or digital signal 266, message 266, and/or notice 266 (e.g., in the vehicle and/or to a phone or personal device of a user or operator).

The active hydrogen leak flag 264 and the passive hydrogen leak flag 266 may include different audio and/or video signals including, but not limited to flashing lights of different colors, alarms, warnings, written notices, etc. In some embodiments, the active hydrogen leak flag 264 and the passive hydrogen leak flag 266 may be or comprise the same signal as each other. In other embodiments, the active hydrogen leak flag 264 and the passive hydrogen leak flag 266 may be different (e.g., vary in intensity, frequency, color, etc.). In other embodiments, no indication may be provided by the notification system 260 at all for the passive hydrogen leak flag 266. The utilization of the notification system 260 may improve the operation and/or implementation of the hydrogen storage system 210 in the vehicle 100. The utilization of the notification system 260 may mitigate or prevent damage to the vehicle 100.

If the wake-up time 239 is determined to be less than or equal to the calibrated amount of delay time 251 in step 252, the hydrogen storage system controller 220 may implement the notification system 260 to transmit a "System Preparing" message 262 via an audio or video signal to a user to indicate that the fuel cell system 10 is not ready for use, as shown in step 259.

Figure 3:
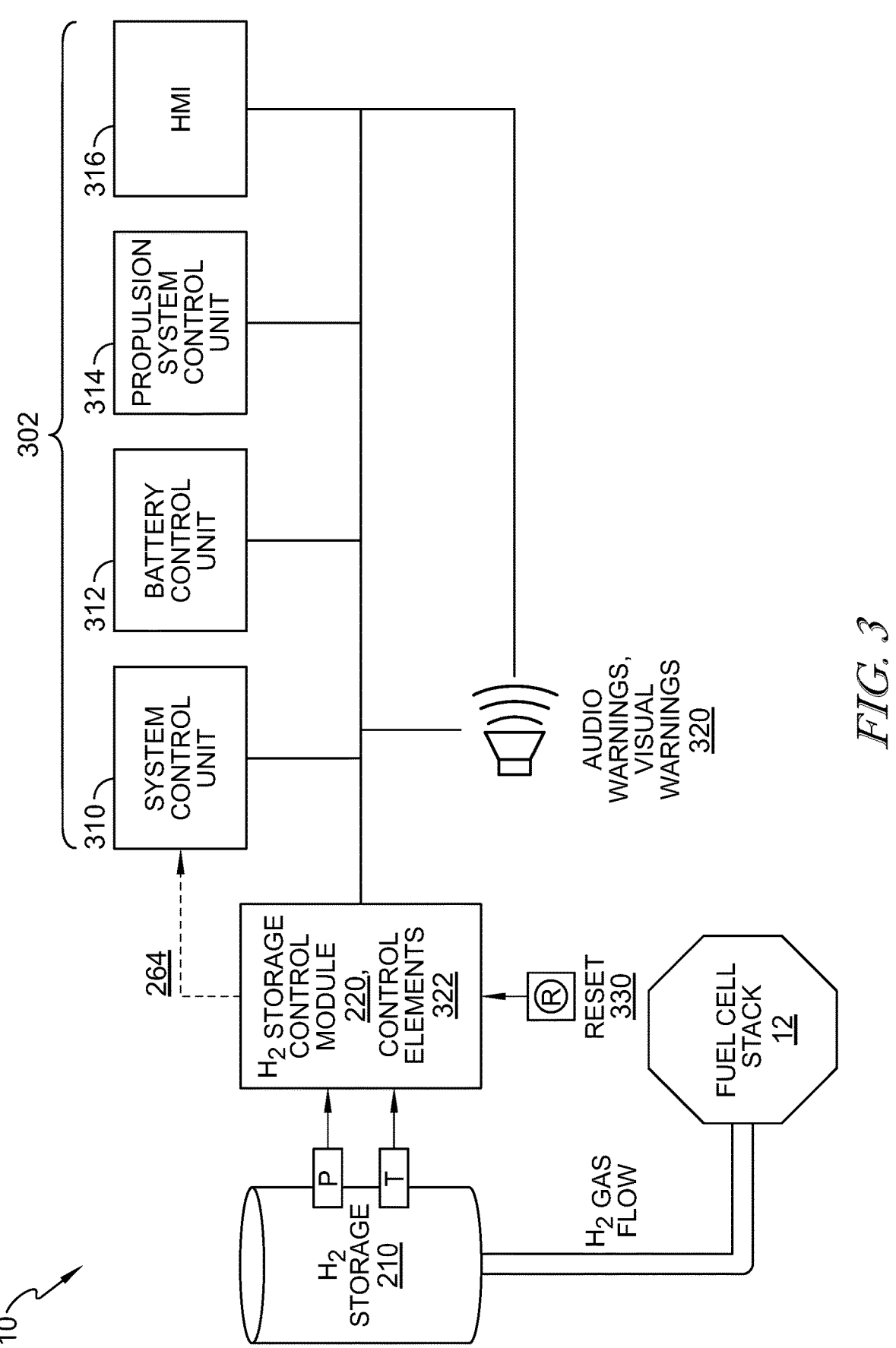
FIG. 3 is a schematic showing communication of the hydrogen leak to other nodes and components of the fuel cell system.

As shown in FIG. 3, the hydrogen storage system controller 220 can communicate the active hydrogen leak flag 264 to other nodes 302 and components of the fuel cell system 10. The hydrogen storage system controller 220 may communicate to these other components via datalinks, analog/digital signaling and/or any other mechanism of electronic communication known in the art. The nodes and components of the fuel cell system 10 may include a system control unit 310, a battery control unit 312, a propulsion system control unit 314, and/or a human-machine interface (HMI) 316. In some embodiments, the fuel cell system 10 may include additional nodes, components, and/or control units.

A system hydrogen storage leak flag 320 may be activated when the active hydrogen leak flag 264 is communicated to different nodes 310, 312, 314, 316. The system hydrogen storage leak flag 320 may be an audio signal 320, a visual signal 320, and/or a warning 320, such as to a user or an operator. If the system hydrogen storage leak flag 320 is activated, the hydrogen storage system controller 220 may electronically engage controlled hydrogen flow control elements 322, such as pipes or valves, to stop or reduce the leakage. Vehicle operators and/or users of the vehicle 100 may be warned of the detected leak via the signals or warnings 320 (e.g., warning buzzers, audio warnings, visual warnings, etc.).

The hydrogen storage system controller 220 and the other control nodes 302 are configured to prevent and/or reduce any dangers, harms, and/or hazards. For example, the hydrogen storage system controller 220 may not engage any potential source of ignition and/or may disengage any existing potential source of ignition that can cause fire and/or explosion due to the introduction of high hydrogen concentrations. The hydrogen storage system controller 220 may also drain any high-voltage bus to reduce power and prevent any such hazards.

The vehicle operator and/or users of the vehicle 100 may be able to reset the active hydrogen leak flag 264 by using a reset button 330 illustrated in FIG. 3. The reset button 330 may be used to recognize any deliberate hydrogen discharge that may have resulted in a change in hydrogen mass in the hydrogen storage system 210. The reset button 320 may be used to allow the user to move the vehicle 100 to a safer location. The reset button 320 may also be used to override the hydrogen storage system controller 220 and/or the notification system 260 and prevent the issuance of any flags 264, 266.

Figure 4:
FIG. 4 is a schematic of one embodiment of a hydrogen storage system comprising more than one hydrogen tank.

FIG. 4 is a schematic of one embodiment of the hydrogen storage system 210 comprising one or more hydrogen tanks 212 that are connected to a fuel cell engine or fuel cell system 10. In this embodiment, a plurality (e.g., three or more) of hydrogen tanks 212 are comprised by the hydrogen storage system 210. The hydrogen storage system 210 includes pressure and temperature sensors 216, thermally activated pressure relief device 410, solenoid valves 402, manual valves 404, a fuel filling receptacle 408, and/or pressure regulation valves 406. The different components of the hydrogen storage system 210 are regulated, monitored, and/or controlled by the hydrogen storage system controller 220. Accordingly, the present disclosure is directed to hydrogen storage systems 210 and methods to detect and/or prevent hydrogen leaks and leakages before, during, and/or after restarting or repowering a fuel cell system so as to prevent detrimental effects to the function, operation, longevity, durability, and/or performance of a fuel cell system 10.

The following described aspects of the present invention are contemplated and non-limiting:

A first aspect of the present invention relates to a system for hydrogen leak detection. The system comprising a hydrogen storage system comprising hydrogen equipped with a temperature sensor and a pressure sensor configured to estimate a mass of the hydrogen in the hydrogen storage system based on measurements of one or more thermodynamic properties of the hydrogen, a hydrogen storage system controller, and a notification system. The measurements of the one or more thermodynamic properties are utilized to by the hydrogen storage system controller to detect a hydrogen leak in the system. The notification system is configured to alert a user of the hydrogen leak.

A second aspect of the present invention relates to a method of detecting a hydrogen leak in a powertrain or vehicle. The method comprises measuring one or more thermodynamic properties of hydrogen in a hydrogen storage system before the powertrain or vehicle is shutdown, detecting a first mass of hydrogen in the hydrogen storage system before the powertrain or vehicle is shutdown based on the one or more thermodynamic properties of hydrogen in a hydrogen storage system before the powertrain or vehicle is shutdown, measuring the one or more thermodynamic properties of hydrogen in the hydrogen storage system after the powertrain or vehicle is restarted, detecting a second mass of hydrogen in a hydrogen storage system after the powertrain or vehicle is restarted based on the one or more thermodynamic properties of hydrogen in the hydrogen storage system after the powertrain or vehicle is restarted, calculating a hydrogen mass leak rate of a hydrogen leak in the powertrain or vehicle, and preventing damage to the vehicle or powertrain when there is a hydrogen leak.

In the first aspect of the present invention, the hydrogen storage system controller may be configured to detect a hydrogen leak in the system when a powertrain or vehicle comprising the system undergoes system wake-up after a shutdown period. The hydrogen leak may be detected by determining a first mass of hydrogen in the hydrogen storage system before the powertrain or vehicle is shut down and a second mass of hydrogen in the hydrogen storage system after the powertrain or vehicle undergoes system wake-up.

In the first aspect of the present invention, the difference between the first mass of hydrogen in the hydrogen storage system and the second mass of hydrogen in the hydrogen storage system may be compared to a pre-set leak reference amount to detect an occurrence of the hydrogen leak. In the first aspect of the present invention, the pre-set leak reference amount may be pre-determined based on user input, models, and or look-up tables. In the first aspect of the present invention, the difference between the first mass of hydrogen in the hydrogen storage system and the second mass of hydrogen in the hydrogen storage system may be a hydrogen delta mass determined by first-order filtering.

In the first aspect of the present invention, the one or more thermodynamic properties of the hydrogen may include pressure, temperature, or volume of hydrogen in the hydrogen storage system, and the hydrogen storage system controller may calculate a mass of the hydrogen in the hydrogen storage system based on the one or more thermodynamic properties.

In the first aspect of the present invention, the hydrogen storage system controller may be configured to incorporate a calibrated amount of delay time before detecting the hydrogen leak in the system. In the first aspect of the present invention, the calibrated amount of delay time and pre-set leak reference may account for hydrogen permeability.

In the first aspect of the present invention, the system may further comprise a reset button, configured to override the notification system. In the first aspect of the present invention, the hydrogen storage system controller may communicate the hydrogen leak to other nodes or components of the system.

In the second aspect of the present invention, the method may further comprise calculating the hydrogen mass leak rate in the powertrain or vehicle using a hydrogen storage system controller. In the second aspect of the present invention, the method may further comprise calculating the hydrogen mass leak rate using the first mass of hydrogen and the second mass of hydrogen and a stay-put time and comparing the hydrogen mass leak to a pre-set leak reference to determine an occurrence of the hydrogen leak.

In the second aspect of the present invention, the method may further comprise comparing the first mass of hydrogen in the hydrogen storage system and the second mass of hydrogen in the hydrogen storage system and calculating a hydrogen delta mass using first-order filtering. In the second aspect of the present invention, the method may further comprise utilizing the pre-set leak reference amount based on a user input, a model, and or a look-up table.

In the second aspect of the present invention, the method may further comprise the hydrogen storage system controller waiting for a calibrated amount of delay time before detecting the hydrogen leak in the powertrain or vehicle. In the second aspect of the present invention, a hydrogen permeability comprises the calibrated amount of delay time and a pre-set leak reference.

In the second aspect of the present invention, the method may further comprise the hydrogen storage system controller communicating an occurrence of the hydrogen leak to other nodes or components of the powertrain or vehicle. In the second aspect of the present invention, the method may further comprise using a notification system to alert a user of the hydrogen leak. The notification system may comprise an audio signal, a visual signal, or a warning to the user. In the second aspect of the present invention, the method may further comprise pressing a reset button to override the notification system.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system for hydrogen leak detection, comprising:
a hydrogen storage system comprising hydrogen and equipped with a temperature sensor and a pressure sensor configured to estimate a mass of the hydrogen in the hydrogen storage system based on measurements of one or more thermodynamic properties of the hydrogen,
a hydrogen storage system controller, and
a notification system,
wherein the measurements of the one or more thermodynamic properties are utilized by the hydrogen storage system controller to detect a hydrogen leak in the system,
wherein the notification system is configured to alert a user of the hydrogen leak,
wherein the hydrogen storage system controller is configured to incorporate a calibrated amount of delay time before detecting the hydrogen leak in the system, and
wherein the hydrogen storage system controller is configured to measure a wake-up time against the calibrated amount of delay time to determine whether to instruct the system to detect the hydrogen leak in the system, wherein the wake-up time is a difference between a current time and a time of wake-up of the system.

2. The system of claim 1, wherein the hydrogen storage system controller is configured to detect the hydrogen leak in the system when a powertrain or vehicle comprising the system undergoes a system wake-up after a shutdown period by detecting a first mass of hydrogen in the hydrogen storage system before the powertrain or vehicle is shutdown and a second mass of hydrogen in the hydrogen storage system after the powertrain or vehicle undergoes the system wake-up.

3. The system of claim 2, wherein the hydrogen storage system controller is configured to compare a difference between the first mass of hydrogen in the hydrogen storage system and the second mass of hydrogen in the hydrogen storage system to a pre-set leak reference amount to detect the hydrogen leak.

4. The system of claim 3, wherein the pre-set leak reference amount is pre-determined based on a user input, a model, or a look-up table.

5. The system of claim 3, wherein the difference between the first mass of hydrogen in the hydrogen storage system and the second mass of hydrogen in the hydrogen storage system is a hydrogen delta mass determined by first-order filtering.

6. The system of claim 1, wherein the one or more thermodynamic properties of the hydrogen include pressure, temperature, or volume of hydrogen in the hydrogen storage system, and wherein the hydrogen storage system controller calculates a mass of the hydrogen in the hydrogen storage system based on the one or more thermodynamic properties.

7. The system of claim 1, wherein the calibrated amount of delay time and a pre-set leak reference accounts for hydrogen permeability.

8. The system of claim 1, wherein the system further comprises a reset button configured to override the notification system.

9. The system of claim 1, wherein the hydrogen storage system controller communicates the hydrogen leak to other nodes or components of the system.

10. The system of claim 1, wherein the calibrated amount of delay time is between about 0.1 seconds and about 20 seconds.

11. A method of detecting a hydrogen leak in a powertrain or vehicle, comprising:

measuring one or more thermodynamic properties of hydrogen in a hydrogen storage system before the powertrain or vehicle is shutdown, detecting a first mass of hydrogen in the hydrogen storage system before the powertrain or vehicle is shutdown based on the one or more thermodynamic properties of hydrogen in the hydrogen storage system before the powertrain or vehicle is shutdown, measuring the one or more thermodynamic properties of hydrogen in the hydrogen storage system after the powertrain or vehicle is restarted, detecting a second mass of hydrogen in the hydrogen storage system after the powertrain or vehicle is restarted based on the one or more thermodynamic properties of hydrogen in the hydrogen storage system after the powertrain or vehicle is restarted, calculating a hydrogen mass leak rate of a hydrogen leak in the powertrain or vehicle, waiting for a calibrated amount of delay time before detecting the hydrogen leak in the powertrain or vehicle, measuring a wake-up time against the calibrated amount of delay time to determine whether to detect the hydrogen leak in the powertrain or vehicle, wherein the wake-up time is a difference between a current time and a time of wake-up of the powertrain or vehicle, and preventing damage to the vehicle or powertrain when there is the hydrogen leak.

12. The method of claim 11, further comprising calculating the hydrogen mass leak rate in the powertrain or vehicle using a hydrogen storage system controller.

13. The method of claim 12, wherein the method further comprises:

calculating the hydrogen mass leak rate using the first mass of hydrogen and the second mass of hydrogen and a stay-put time, and comparing the hydrogen mass leak to a pre-set leak reference to determine an occurrence of the hydrogen leak.

14. The method of claim 13, further comprising comparing the first mass of hydrogen in the hydrogen storage system and the second mass of hydrogen in the hydrogen storage system and calculating a hydrogen delta mass using first-order filtering.

15. The method of claim 13, further comprising utilizing the pre-set leak reference based on a user input, a model, or, a look-up table.

16. The method of claim 11, wherein a hydrogen permeability comprises the calibrated amount of delay time and a pre-set leak reference.

17. The method of claim 11, further comprising communicating an occurrence of the hydrogen leak to other nodes or components of the powertrain or vehicle.

18. The method of claim 11, further comprising using a notification system to alert a user of the hydrogen leak, wherein the notification system comprises an audio signal, a visual signal, or a warning to the user.

19. The method of claim 18, further comprising pressing a reset button to override the notification system.

* * * * *